(12) United States Patent
Singh et al.

(10) Patent No.: US 10,129,075 B2
(45) Date of Patent: *Nov. 13, 2018

(54) MULTICAST ONLY FAST RE-ROUTE OVER REMOTE LOOP-FREE ALTERNATE BACKUP PATH

(71) Applicant: Juniper Networks, Inc., Sunnyvale, CA (US)

(72) Inventors: Nischal Singh, Sunnyvale, CA (US); Hariharan Boopathy, Bangalore (IN); Rahul Unnikrishnan, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/855,595

(22) Filed: Dec. 27, 2017

(65) Prior Publication Data

US 2018/0123869 A1    May 3, 2018

Related U.S. Application Data

(63) Continuation of application No. 14/870,941, filed on Sep. 30, 2015, now Pat. No. 9,860,110.

(51) Int. Cl.
*H04L 12/24* (2006.01)
*H04L 12/18* (2006.01)
*H04L 12/761* (2013.01)

(52) U.S. Cl.
CPC .......... *H04L 41/0654* (2013.01); *H04L 12/18* (2013.01); *H04L 45/16* (2013.01); *H05K 999/99* (2013.01); *H04L 12/185* (2013.01)

(58) Field of Classification Search
None
See application file for complete search history.

(56) References Cited

U.S. PATENT DOCUMENTS 9,401,859 B2 *   7/2016   Kotalwar .............. H04L 12/185
9,860,110 B2     1/2018   Singh et al.
(Continued)

OTHER PUBLICATIONS

Examination Report from counterpart European Application No. 16190852.0, dated Mar. 12, 2018, 9 pp.
(Continued)

*Primary Examiner* — Mohammad S Adhami
(74) *Attorney, Agent, or Firm* — Shumaker & Sieffert, P.A.

(57) ABSTRACT

Techniques are described for enhancements to Protocol Independent Multicast (PIM) to support multicast only fast re-route (MoFRR) over a remote loop free alternate (RLFA) backup path in a network. This disclosure describes a modified PIM control message having a new PIM message type and an additional field to indicate an address of a RLFA network device in the RLFA backup path. According to techniques of this disclosure, network devices along the RLFA backup path are configured to forward the modified PIM control message toward the RLFA network device instead of toward a source of a requested multicast group. When the RLFA network device receives the modified PIM control message, the RLFA network device is configured to forward a conventional PIM control message towards the source of the requested multicast group. In this way, PIM can be used to provide MoFRR over a RLFA backup path.

18 Claims, 6 Drawing Sheets

(56) References Cited

U.S. PATENT DOCUMENTS

| | | | |
|---|---|---|---|
| 2009/0201803 A1* | 8/2009 | Filsfils | H04L 12/185 370/222 |
| 2013/0336192 A1* | 12/2013 | Zhao | H04L 45/16 370/312 |
| 2014/0198634 A1 | 7/2014 | Kumar | |
| 2015/0036685 A1* | 2/2015 | Wijnands | H04L 45/507 370/390 |
| 2015/0103671 A1 | 4/2015 | Ernström | |
| 2015/0172070 A1* | 6/2015 | Csaszar | H04L 12/1863 370/218 |
| 2017/0093695 A1 | 3/2017 | Kebler et al. | |

OTHER PUBLICATIONS

Adams et al., "Protocol Independent Multicast—Dense Mode (PIM-DM): Protocol Specification (Revised)," RFC 3973, Network Working Group, The Internet Society, Jan. 2005, 61 pp.

Atlas et al., "An Architecture for IP/LDP Fast-Reroute Using Maximally Redundant Trees," Routing Area Working Group, Jul. 4, 2011, 21 pp.

Atlas et al., "Basic Specification for IP Fast Reroute: Loop-Free Alternates," RFC 5286, Network Working Group, The IETF Trust, Sep. 2008, 31 pp.

Bryant et al., "Remote Loop-Free Alternate (LFA) Fast Reroute (FRR)," RFC 7490, Internet Engineering Task Force (IETF), The IETF Trust, Apr. 2015, 29 pp.

Extended Search Report from counterpart European Application No. 16190852.0, dated Feb. 16, 2017, 12 pp.

Fenner et al., "Protocol Independent Multicast—Sparse Mode (PIM-SM): Protocol Specification (Revised)," RFC 4601, Network Working Group, The Internet Society, Aug. 2006, 112 pp.

Handly et al., "Bidirectional Protocol Independent Multicast (BIDIR-PIM)," RFC 5015, Network Working Group, The Internet Society, Oct. 2007, 43 pp.

Holbrook et al., "Source-Specific Multicast for IP," RFC 4607, Network Working Group, The Internet Society, Aug. 2006, 19 pp.

Karan et al., "Multicast only fast Re-Route draft-ietf-rtgwg-mofrr-02," Network Working Group, Internet-Draft, Jun. 19, 2013, 14 pp.

Karan et al., "Multicast only Fast Re-Route draft-ietf-rtgwg-mofrr-08," Network Working Group, Internet-Draft, May 18, 2015, 14 pp.

Karan et al., "Multicast only Fast Re-Route," Network Working Group, Internet Draft, draft-ietf-rtgwg-mofrr-04, May 14, 2014, 14 pp.

Communication pursuant to Article 94(3) EPC from counterpart European Patent Application No. 16190852.0, dated Mar. 12, 2018, 9 pp.

Kebler et al., "PIM Extensions for Protection Using Maximally Redundant Trees," Protocol Independent Multicast Working Group, Jul. 12, 2013, 12 pp.

Response to Extended Search Report dated Feb. 2, 2017, from counterpart European Application No. 16190852.0, filed Oct. 4, 2017, 25 pp.

Wijnands et al., "Label Distribution Protocol Extensions for Point-to-Multipoint and Multipoint-to-Multipoint Label Switched Paths," Internet Engineering Task FOrce (IETF), RFC 6388, Nov. 2011, 39 pp.

Wijnands et al., "Multipoint LDP in-band signaling for Point-to-Multipoint and Multipoint-to-Multipoint Label Switched Paths," Network Working Group, Internet Draft, draft-ietf-mpls-mldp-in-band-signaling-08, Nov. 29, 2012, 13 pp.

Wijnands, et al., "Using Multipoint LDP When the Backbone Has No Route to the Root," RFC 6512, Internet Engineering Task Force (IETF), The IETF Trust, Feb. 2012, 12 pp.

Prosecution History from U.S. Appl. No. 14/980,945, dated from Jun. 5, 2017 through Feb. 20, 2018, 67 pp.

Prosecution History from U.S. Appl. No. 14/870,941, dated from Sep. 22, 2017 through Oct. 27, 2017, 26 pp.

Response to Examination Report dated Mar. 12, 2018, from counterpart European Application No. 16190852.0, filed Jul. 11, 2018, 14 pp.

* cited by examiner

| PIM VER | TYPE | RESERVED | CHECKSUM |
|---|---|---|---|
| PQ NODE ADDRESS ||||
| UPSTREAM NEIGHBOR ADDRESS ||||
| RESERVED || NUM GROUPS | HOLDTIME |
| MULTICAST GROUP ADDRESS 1 ||||
| NUMBER OF JOINED SOURCES ||| NUMBER OF PRUNED SOURCES |
| JOINED SOURCE ADDRESS 1 ||||
| ... ||||
| JOINED SOURCE ADDRESS n ||||
| PRUNED SOURCE ADDRESS 1 ||||
| ... ||||
| PRUNED SOURCE ADDRESS n ||||
| ... ||||
| MULTICAST GROUP ADDRESS m ||||
| NUMBER OF JOINED SOURCES ||| NUMBER OF PRUNED SOURCES |
| JOINED SOURCE ADDRESS 1 ||||
| ... ||||
| JOINED SOURCE ADDRESS n ||||
| PRUNED SOURCE ADDRESS 1 ||||
| ... ||||
| PRUNED SOURCE ADDRESS n ||||

FIG. 4

MULTICAST ONLY FAST RE-ROUTE OVER REMOTE LOOP-FREE ALTERNATE BACKUP PATH

This application is a continuation of U.S. patent application Ser. No. 14/870,941, filed Sep. 30, 2015, the entire contents of which is incorporated herein by reference.

TECHNICAL FIELD

The invention relates to computer networks and, more particularly, to distribution of multicast traffic over computer networks.

BACKGROUND

A computer network is a collection of interconnected computing devices that exchange data and share resources. In a packet-based network the computing devices communicate data by dividing the data into small blocks called packets. Certain devices within the network, such as routers and switches, maintain routing and/or forwarding information that describe paths through the network. In this way, the packets may be individually transmitted across the network from a source device to a destination device. The destination device extracts the data from the packets and assembles the data into its original form. Dividing the data into packets enables the source device to resend only those individual packets that may be lost during transmission.

Examples of computer networks include enterprise networks, branch networks, service provider networks, home networks, virtual private networks (VPNs), local area network (LANs), virtual LANs (VLANs) and the like. In any case, the computer networks may enable remotely located sources and receivers to share data. In some cases, the computer network may be configured to support multicast traffic, such as Internet Protocol Television (IPTV), desktop conferences, corporate broadcasts, music and video web casts, and other forms of multimedia content. For example, the computer network may utilize protocol independent multicast (PIM) as a multicast routing protocol to build distribution trees through the computer network for the transmission of multicast traffic from sources to receivers or subscriber devices for particular multicast groups. PIM may operate in several different modes, including Dense Mode (DM), Sparse Mode (SM) in Source-Specific Multicast (SSM) mode or Any Source Multicast (ASM) mode, and Bidirectional (BIDIR) mode.

SUMMARY

In general, this disclosure describes enhancements to Protocol Independent Multicast (PIM) to support multicast only fast re-route (MoFRR) over a remote loop free alternate (RLFA) backup path in a network. A network device configured with MoFRR calculates both a primary path and a backup path in a network to provide resilience, and performs a switchover to the backup path in the case of a failure in the primary path. In some cases, the backup path may be a RLFA backup path that directs traffic to a remote node (i.e., a node that is not a direct neighbor of the network device) to avoid unicast traffic looping in the backup path. If PIM is used to signal the RLFA backup path, however, multicast join looping may occur in the backup path and, in some cases, the backup path may not be established.

This disclosure describes a modified PIM control message having a new PIM message type and an additional field to indicate an address of a RLFA network device. According to techniques of this disclosure, network devices along the RLFA backup path are configured to forward the modified PIM control message toward the RLFA network device instead of toward a source of a requested multicast group. When the RLFA network device receives the modified PIM control message, the RLFA network device is configured to forward a conventional PIM control message towards the source of the requested multicast group. In this way, PIM can be used to support MoFRR over a RLFA backup path.

In one example, this disclosure is directed to a method comprising receiving, by a network device configured with multicast only fast re-route (MoFRR), a join request initiated by one or more receivers for a multicast group; sending, by the network device, a first protocol independent multicast (PIM) control message including the join request to a first upstream network device along a primary path toward a source of the multicast group; sending, by the network device, a second PIM control message including the join request to a second upstream network device along a remote loop-free alternate (RLFA) backup path toward a RLFA network device, the second PIM control message further including a different PIM message type than the first PIM control message and an address of the RLFA network device; receiving, by the network device from the source of the multicast group, multicast data packets for the multicast group on at least one of the primary path or the RLFA backup path; and forwarding, by the network device toward the one or more receivers, the multicast data packets for the multicast group.

In another example, this disclosure is directed to a network device comprising a routing engine configured to receive a join request for a multicast group from one or more receivers, send a first protocol independent multicast (PIM) control message including the join request to a first upstream network device along a primary path toward a source of the multicast group, and, wherein the network device is configured with multicast only fast re-route (MoFRR), send a second PIM control message including the join request to a second upstream network device along a remote loop-free alternate (RLFA) backup path toward a RLFA network device, the second PIM control message further including a different PIM message type than the first PIM control message and an address of the RLFA network device. The network device also comprises a forwarding engine configured to receive, from the source of the multicast group, multicast data packets for the multicast group on at least one of the primary path or the RLFA backup path, and forward the multicast data packets for the multicast group toward the one or more receivers.

In a further example, this disclosure is directed to a method comprising receiving, by a network device from a downstream neighbor network device, a first protocol independent multicast (PIM) control message including a join request for a multicast group, a first PIM message type, and an address of a remote loop-free alternate (RLFA) network device in a RLFA backup path; based on the network device not being the RLFA network device identified in the first PIM control message, generating, by the network device, a second PIM control message including the join request, the first PIM message type, and the address of the RLFA network device, and sending the second PIM control message along the RLFA backup path toward the RLFA network device; based on the network device being the RLFA network device identified in the first PIM control message, generating, by the network device, a third PIM control message including the join request and a second PIM message type that is different than the first PIM message type, and sending the third PIM control message along the RLFA backup path toward a source of the multicast group; receiving, by the network device from the source of the multicast group, multicast data packets for the multicast group on the RLFA backup path; and forwarding, by the network device, the multicast data packets for the multicast group to the downstream neighbor network device along the RLFA backup path.

In an additional example, this disclosure is directed to a network device comprising a routing engine configured to receive, from a downstream neighbor network device, a first protocol independent multicast (PIM) control message including a join request for a multicast group, a first PIM message type, and an address of a remote loop-free alternate (RLFA) network device in a RLFA backup path, based on the network device not being the RLFA network device identified in the first PIM control message, generate a second PIM control message including the join request, the first PIM message type, and the address of the RLFA network device, and send the second PIM control message along the RLFA backup path toward the RLFA network device, and based on the network device being the RLFA network device identified in the first PIM control message, generate a third PIM control message including the join request and a second PIM message type that is different than the first PIM message type, and send the third PIM control message along the RLFA backup path toward a source of the multicast group. The network device also comprises a forwarding engine configured to receive, from the source of the multicast group, multicast data packets for the multicast group on the RLFA backup path, and forward the multicast data packets for the multicast group to the downstream neighbor network device along the RLFA backup path.

The details of one or more examples of the invention are set forth in the accompanying drawings and the description below. Other features, objects, and advantages of the invention will be apparent from the description and drawings, and from the claims.

BRIEF DESCRIPTION OF DRAWINGS

FIG. 4 is a conceptual diagram illustrating an example message format of a modified protocol independent multicast (PIM) control message sent by a network device to perform MoFRR over a RLFA backup path.

DETAILED DESCRIPTION

Figure 1:
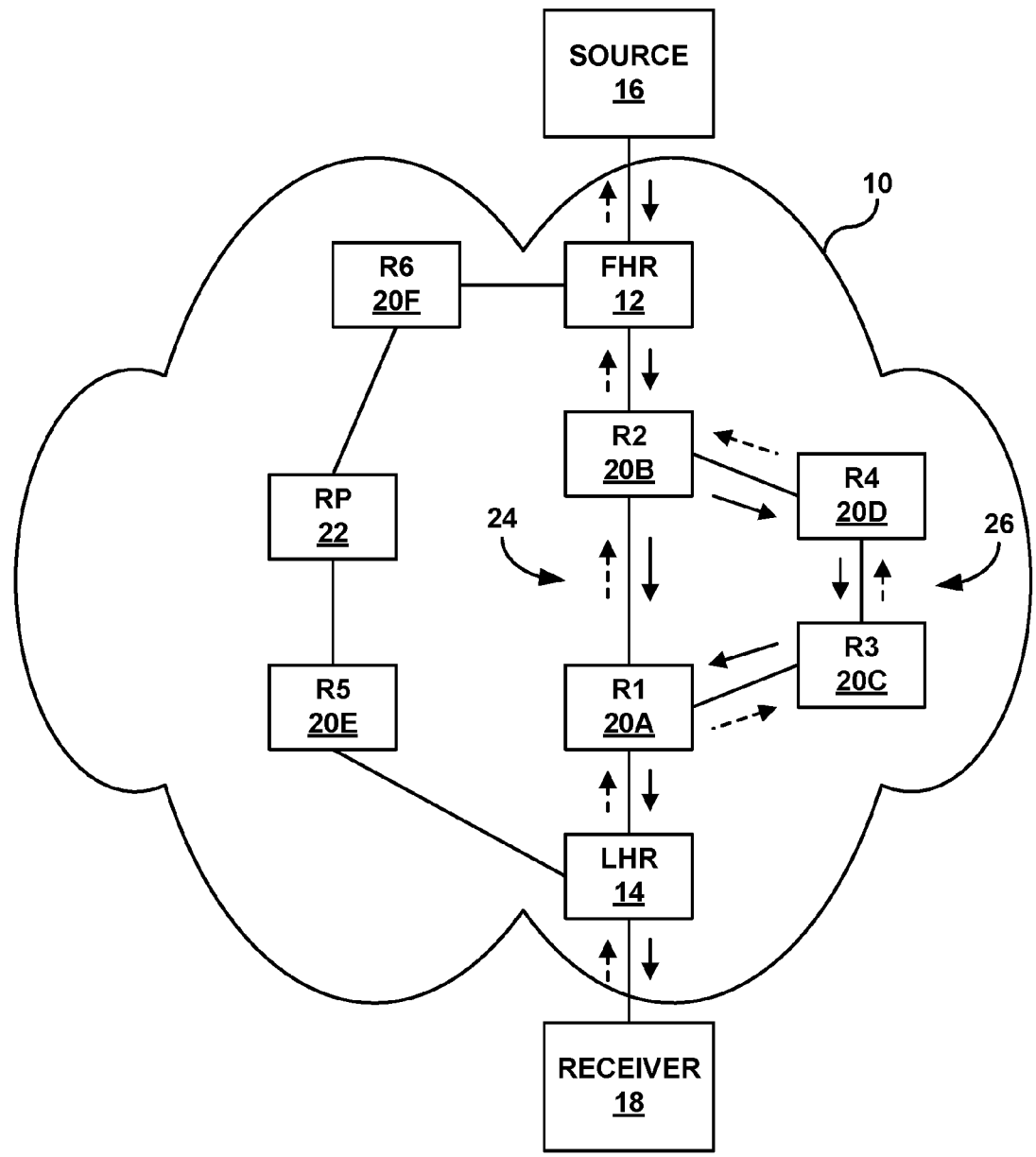
FIG. 1 is a block diagram illustrating an example computer network including a network device configured to transmit multicast traffic between a source and a receiver.

FIG. 1 is a block diagram illustrating an example computer network 10 including network devices configured to transmit multicast traffic between a source 16 and a receiver 18. Network 10 may comprise a private network or a public network, such as the Internet. For example, network 10 may be an enterprise network, a campus network, a service provider network, a home network, a local area network (LAN), a virtual local area network (VLAN), virtual private network (VPN), or another autonomous system. In any of these examples, remotely located source 16 and receiver 18 may share data via network 10. In an example of network 10 as an enterprise network, each of source 16 and receiver 18 may comprise one or more servers or employee computer terminals located in different regions of a single office location, or may comprise a remote office location of a corporation.

In the illustrated example, network 10 comprises an Internet Protocol (IP) network including network devices that use a Protocol Independent Multicast (PIM) protocol to route multicast traffic through network 10 between source 16 and receiver 18 for particular multicast groups. The PIM protocol may operate in several different modes, including Dense Mode (DM), Sparse Mode (SM) in Source-Specific Multicast (SSM) mode or Any Source Multicast (ASM) mode, and Bidirectional (BIDIR) mode. Additional information regarding PIM protocols may be found in Adams, A., et al., "Protocol Independent Multicast Version 2-Dense Mode Specification," RFC 3973, 2005; Fenner, B., et al., "Protocol Independent Multicast-Sparse Mode (PIM-SM): Protocol Specification (Revised)," RFC 4601, 2006; Holbrook, H. and B. Cain, "Source-Specific Multicast for IP," IETF RFC 4607, 2006; and Handley, M., et al., "Bidirectional Protocol Independent Multicast (BIDIRPIM)," IETF RFC 5015, 2007, the entire contents of each of which are incorporated by reference herein.

Network 10 includes a plurality of network devices, including a first hop router (FHR) 12 connected to source 16, a last hop router (LHR) 13 connected to receiver 18, routers 20A-20H ("routers 20"), and a router designated as a rendezvous point (RP) 22. In a typical network topology that utilizes the PIM protocol, additional network devices may be included to the left of RP 22 such that RP 22 is generally centrally located within network 10. For purposes of illustration, these additional network devices are not shown in FIG. 1.

Each of source 16 and receiver 18 may be included in a remote site (not shown) that may be a local area network (LAN) or a wide area network (WAN) comprising a plurality of subscriber devices, such as desktop computers, laptops, workstations, PDAs, wireless devices, network-ready appliances, file servers, print servers or other devices. The remote sites may be configured to support multicast traffic, such as Internet Protocol Television (IPTV), desktop conferences, corporate broadcasts, music and video web casts, and other forms of multimedia content.

In the example illustrated in FIG. 1, source 16 may provide traffic for one or more multicast groups, and receiver 18 may request or subscribe to traffic from one or more multicast groups. In other examples, network devices within network 10 may be connected to more than one source and/or more than one receiver. According to the PIM protocol, RP 22 learns and stores source addresses for a certain range of multicast groups provided by source 16 and/or other sources in network 10. Other RPs in network 10, not shown in FIG. 1, may be associated with different ranges of multicast groups provided by source 16 and/or the other sources. In this way, each of FHR 12, LHR 13, and routers 20 does not need to learn and store the source addresses for every multicast group offered in network 10, but only needs to learn the addresses of RP 22 and the other RPs associated with different ranges of multicast groups. In the illustrated example of FIG. 1, RP 22 knows the address of source 16, but FHR 12, LHR 13 and routers 20 may only know the address of RP 22.

As an example, when receiver 18 is interested in receiving multicast traffic for a given multicast group, receiver 18 may send a request to join the multicast group to LHR 14 in network 10. Upon receiving the request from receiver 18, LHR 14 initiates establishment of a multicast distribution tree for the given multicast group. If LHR 14 is aware of the source of the multicast group, e.g., source 16, LHR 14 may initiate establishment of a source tree toward source 16 using a (S,G) PIM control message that includes a join request for the source (S) and the multicast group (G). If LHR 14 is not aware of the source of the multicast group, LHR 14 may first initiate establishment of a shared tree toward RP 22 by using a (*,G) PIM control message that includes a join request for any source (*) and the multicast group (G). Once LHR 14 learns the source of the multicast group, LHR 14 may subsequently initiate establishment of a source tree directly toward source 16, which may be a shortest path tree (SPT), and may tear down the shared tree toward RP 22.

Regardless of which type of multicast distribution tree is established in network 10 for receiver 18 to receive multicast traffic from source 16, it may be desirable for one or more of the network devices of the multicast distribution tree to support multicast only fast re-route (MoFRR) to provide protection for one or more links or nodes along a primary path of the multicast distribution tree. The example of FIG. 1 illustrates a source tree established between LHR 14 and FHR 12 in network 10 in which the source tree includes a primary path 24 and a backup path 26. Primary path 24 includes a direct link between R1 20A and its upstream neighbor R2 20B, and backup path 26 includes a multi-hop path to R2 20B that includes R3 20C and R4 20D. Backup path 26, therefore, provides protection for the direct link between R1 20A and R2 20B along primary path 24.

In FIG. 1, the dashed arrows indicate PIM control messages (i.e., PIM join messages and/or PIM prune messages) sent towards source 16 over the multicast distribution tree, and the solid arrows indicate multicast traffic being forwarded over the multicast distribution tree towards receiver 18. In the illustrated example, R1 20A may be configured with MoFRR such that R1 20A calculates primary path 24 toward source 16, and also calculates backup path 26 toward source 16. For example, when R1 20A receives a PIM control message from LHR 14, R1 20A selects R2 20B as its primary next hop towards source 16 and sends a PIM control message to R2 20B along primary path 24. In accordance with MoFRR, R1 20A also selects R3 20C as its backup next hop towards source 16 and sends a PIM control message to R3 20C along backup path 26.

Upon establishment of the two paths, R1 20A may receive multicast data packets from source 16 over both primary path 24 and backup path 26. R1 20A may be configured to forward the multicast data packets received over primary path 24, and to perform a switchover to backup path 26 in the case of a failure in primary path 24. Additional information regarding MoFRR may be found in Karan, A., et al., "Multicast only Fast Re-Route," draft-ietf-rtgwg-mofrr-04, IETF Internet-Draft, Network Working Group, May 14, 2014 (hereinafter referred to as "draft-karan,"), the contents of which are incorporated herein by reference.

In some cases, R1 20A may establish backup path 26 as a loop-free alternates (LFA) backup path in which direct neighbor R3 20C is a LFA network device capable of forwarding traffic along backup path 26 without looping back to R1 20A. In this case, when R3 20C, a LFA network device, receives the PIM control message from R1 20A, R3 20C selects R4 20D as its best next hop towards source 16 and sends a PIM control message to R4 20D along LFA backup path 26. R4 20D may then operate similar to R3 20C to select R2 20B as its best next hop towards source 16 and send a PIM control message to R2 20B to complete the establishment of backup path 26. Additional information regarding LFA for unicast traffic may be found in Atlas, A., et al., "Basic Specification for IP Fast Reroute: Loop-Free Alternates," RFC 5286, September 2008, the entire contents of which are incorporated by reference herein.

In other cases, R1 20A may establish backup path 26 as a remote loop-free alternates (RLFA) backup path in which direct neighbor R3 20C is not a LFA network device but remote network device R4 20D is a RLFA network device capable of forwarding traffic along backup path 26 without looping back to R1 20A. In this case, for purposes of forwarding data plane traffic, RLFA backup path 26 may include a label switching path (LSP) or other tunneling mechanism established between R1 20A and R4 20D that traverses R3 20C. Additional information regarding RLFA for unicast traffic may be found in Bryant, S., et al., "Remote Loop-Free Alternate (LFA) Fast Reroute (FRR)," RFC 7490, April 2015, the entire contents of which are incorporated by reference herein.

RFC 7490 includes the following definitions to explain how R4 20D may be identified as the RLFA network device (also referred to as a PQ node). A P-space of a router, e.g., R1 20A, with respect to a protected link (e.g., the direct link between R1 20A and R2 20B) is a set of routers reachable from R1 20A using shortest paths, without any of those paths transiting that protected link. In the example of FIG. 1, R3 20C and R4 20D are within the P-space of R1 20A. A Q-space of a router, e.g., R2 20B, with respect to a protected link (e.g., the direct link between R1 20A and R2 20B) is a set of routers from which R2 20B can be reached without any path transiting the protected link. In the example of FIG. 1, R4 20D is within the Q-space of R2 20B, but R3 20C is not within the Q-space of R2 20B because the best path from R3 20C to R2 20B is over the protected link. The nodes in the intersection of the P-space and the Q-Space are referred to as PQ nodes and can be selected a tunnel endpoints for a RLFA backup path in MoFRR.

Issues may arise, however, when attempting to setup RLFA backup path 26 using a multicast control plane protocol, such as PIM. These issues may arise due to the control plane being unaware of data plane traffic tunneling, or due to differences between a unicast view and a multicast view of network topology. For example, when R3 20C, as a non-LFA network device, receives the PIM control message from R1 20A, R3 20C will select R1 20A as its best next hop towards source 16 and send a PIM control message back to R1 20A. In this case, multicast control message looping occurs in backup path 26 such that the backup path is not established and MoFRR protection is not available for the direct link of primary path 24.

The techniques described in this disclosure provide enhancements to PIM to support MoFRR over a RLFA backup path. According to the disclosed techniques, R1 20A may be configured to use a modified PIM control message to establish RLFA backup path 26. As described in more detail below, the modified PIM control message includes a new PIM message type and an additional field to indicate an address of a RLFA network device, e.g., R4 20D. According to the techniques of this disclosure, network devices, e.g., R3 20C, along RLFA backup path 26 are configured to forward the modified PIM control message toward RLFA network device R4 20D instead of toward source 16. When RLFA network device R4 20D receives the modified PIM control message, RLFA network device R4 20D is configured to forward a conventional PIM control message towards source 16. In this way, PIM can be used to support MoFRR over a RLFA backup path.

Figure 2:
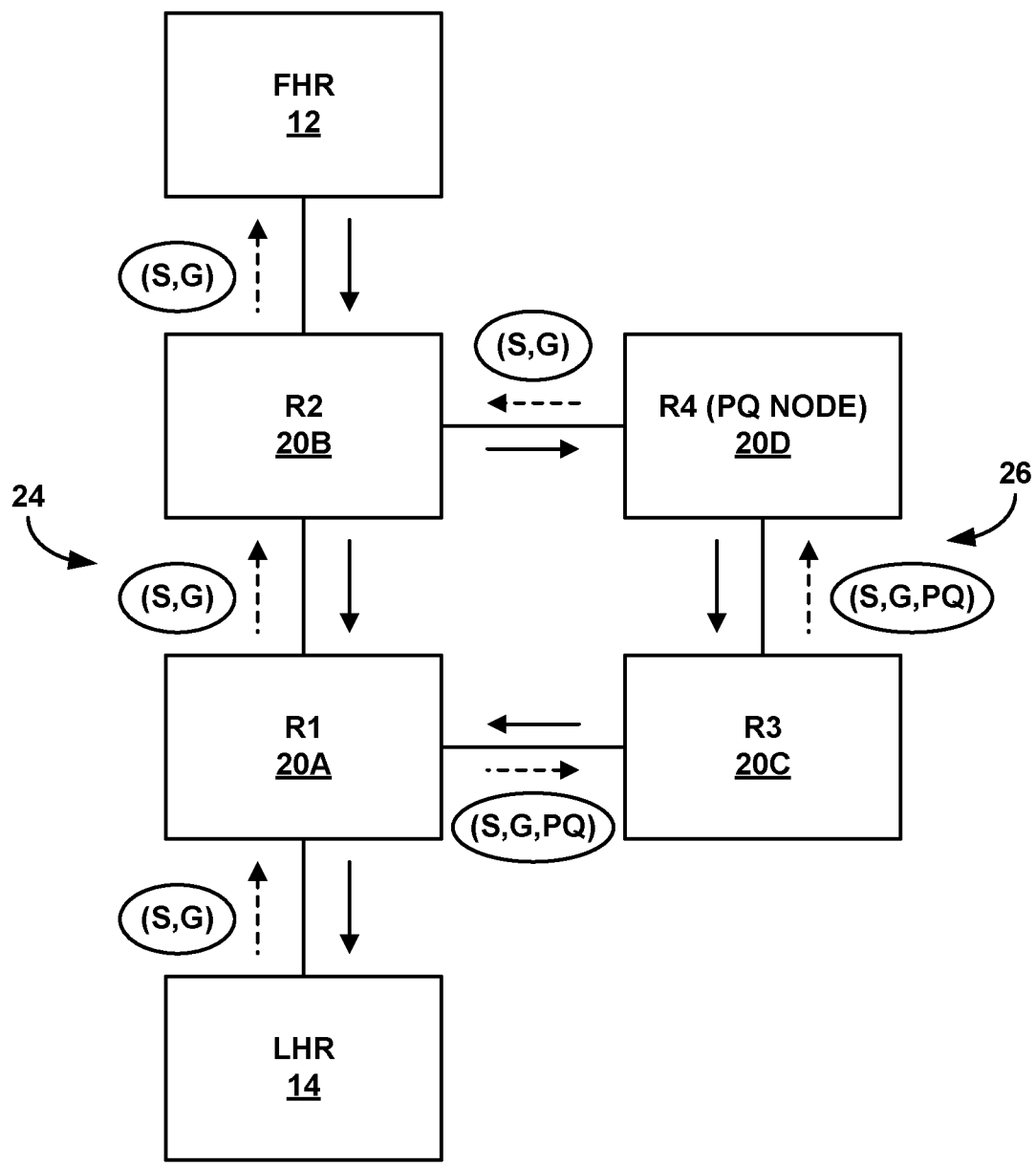
FIG. 2 is a block diagram illustrating several network devices from FIG. 1 configured to perform multicast only fast re-route (MoFRR) over a remote loop-free alternate (RLFA) backup path, in accordance with techniques of this disclosure.

FIG. 2 is a block diagram illustrating several network devices from FIG. 1 configured to perform MoFRR over a RLFA backup path, in accordance with techniques of this disclosure. The example of FIG. 2 illustrates a multicast distribution tree between LHR 14 connected to a receiver, such as receiver 18 from FIG. 1, and FHR 12 connected to a source, such as source 16 from FIG. 1. Within the multicast distribution tree, R1 20A is configured with MoFRR such that R1 20A calculates primary path 24 toward the source and also calculates backup path 26 towards the source.

In this example, R3 20C is not a LFA network device, and backup path 26 is a RLFA backup path that includes a RLFA network device R4 20D (also referred to as a PQ node) that is capable of forwarding traffic along backup path 26 without looping back to R1 20A. Primary path 24 includes a direct link between R1 20A and its upstream neighbor R2 20B. RLFA backup path 26 includes a LSP or other tunneling mechanism between R1 20A and RLFA network device R4 20D that traverses R3 20C and a direct link between R4 20D and R2 20B.

In accordance with the techniques of this disclosure, R1 20A is configured to use a modified PIM control message to establish RLFA backup path 26. The modified PIM control message includes a new PIM message type and an additional field to indicate an address of RLFA network device R4 20D, but is otherwise similar to a conventional PIM control message. The modified PIM control message may be used by a network device, e.g., R1 20A, in which MoFRR is configured and its backup path towards a source is a RLFA backup path, e.g., RLFA backup path 26.

The purpose of the modified PIM control message is to create multicast states in the network devices along RLFA backup path 26, e.g., R3 20C and R4 20D. When R3 20C along RLFA backup path 26 receives the modified PIM control message, R3 20C forwards a modified PIM control message toward RLFA network device R4 20D identified in the modified PIM control message rather than toward the source. If the network device along RLFA backup path 26 that receives the modified PIM control message is the PQ node, e.g., R4 20D, identified in the modified PIM control message, then R4 20D forwards a conventional PIM control message toward the source identified in the modified PIM control message.

In FIG. 2, the dashed arrows indicate PIM control messages sent toward the source to establish primary path 24 and RLFA backup path 26, and the solid arrows indicate multicast traffic being forwarded downstream over primary path 24 and RLFA backup path 26 of the multicast distribution tree. R1 20A receives a PIM control message from its downstream neighbor LHR 14 that includes a join request for the source (S) and the multicast group (G). R1 20A sends a PIM control message to upstream neighbor R2 20B along primary path 24 toward the source (S) of the multicast group (G). The PIM control message includes a PIM message type that indicates a conventional PIM control message, the join request for the source (S) and multicast group (G), and an address of upstream neighbor R2 20B.

According to the disclosed techniques, R1 20A, configured with MoFRR and RLFA, calculates RLFA backup path 26 towards the source, and sends a modified PIM control message to upstream neighbor R3 20C along RLFA backup path 26 toward RLFA network device R4 20D (PQ). The modified PIM control message includes a different PIM message type that indicates the modified PIM control message, the join request for the source (S) and multicast group (G), an address of upstream neighbor R3 20C, and the address of RLFA network device R4 20D (PQ).

Upon sending the conventional PIM control message to R2 20B along primary path 24, R1 20A creates a primary multicast state entry for the multicast group that includes a primary upstream interface to R2 20B along primary path 24 toward the source of the multicast group, and a primary downstream interface to LHR 14 toward the interested receiver of the multicast group. In addition, upon sending the modified PIM control message to R3 20C along RLFA backup path 26, R1 20A creates a backup multicast state entry for the multicast group that includes a backup upstream interface to R3 20C along RLFA backup path 26 toward RLFA network device R4 20D, and a backup downstream interface to LHR 14 toward the interested receiver.

Upon receiving the modified PIM control message from R1 20A, R3 20C determines that it is not RLFA network device R4 20D indicated in the received modified PIM control message. R3 20C then sends another modified PIM control message toward RLFA network device R4 20D indicated in the received modified PIM control message. The modified PIM control message sent by R3 20C includes the PIM message type that indicates the modified PIM control message, the join request for the source (S) and multicast group (G), an address of upstream neighbor R4 20D, and the address of RLFA network device R4 20D (PQ). In addition, R3 20C creates a multicast state entry for the multicast group that includes an upstream interface to RLFA network device R4 20D and a downstream interface to downstream neighbor R1 20A.

Upon receiving the modified PIM control message from R3 20C, R4 20D determines that it is RLFA network device R4 20D indicated in the received modified PIM control message. R4 20D then sends a PIM control message to upstream neighbor R2 20B toward the source indicated in the received modified PIM control message. The PIM control message sent by R4 20D includes the PIM message type that indicates the conventional PIM control message, the join request for the source (S) and multicast group (G), and the address of upstream neighbor R2 20B. In addition, R4 20D creates a multicast state entry for the multicast group that includes an upstream interface to upstream neighbor R2 20B and a downstream interface to downstream neighbor R3 20C.

Once multicast states are created on all the network devices in primary path 24 and RLFA backup path 26, the two paths may operate in a live-live or active-active implementation and both begin pulling traffic for the requested multicast group from the source. For example, R4 20D may receive multicast data packets for the requested multicast group from R2 20B on the upstream interface of its multicast state entry for the multicast group. R4 20D then forwards the multicast data packets to downstream neighbor R3 20C along RLFA backup path 26 according to the downstream interface of its multicast state entry for the multicast group. R3 20C similarly receives the multicast data packets from R4 20D on the upstream interface of its multicast state entry, and forwards the multicast data packets to downstream neighbor R1 20A along RLFA backup path 26 according to the downstream interface of its multicast state entry.

When R1 20A receives the multicast traffic for the requested multicast group on both primary path 24 and RLFA backup path 26, R1 20A only forwards the multicast data packets received on one of the paths. For example, if no failure is detected in primary path 24, R1 20A forwards the multicast data packets received from R2 20B over primary path 24 to LHR 14 according to the primary multicast state entry for the multicast group. If a failure is detected in primary path 24, R1 20A performs a switchover to forward the multicast data packets received from R3 20C over RLFA backup path 26 to LHR 14 according to the backup multicast state entry for the multicast group.

Figure 3:
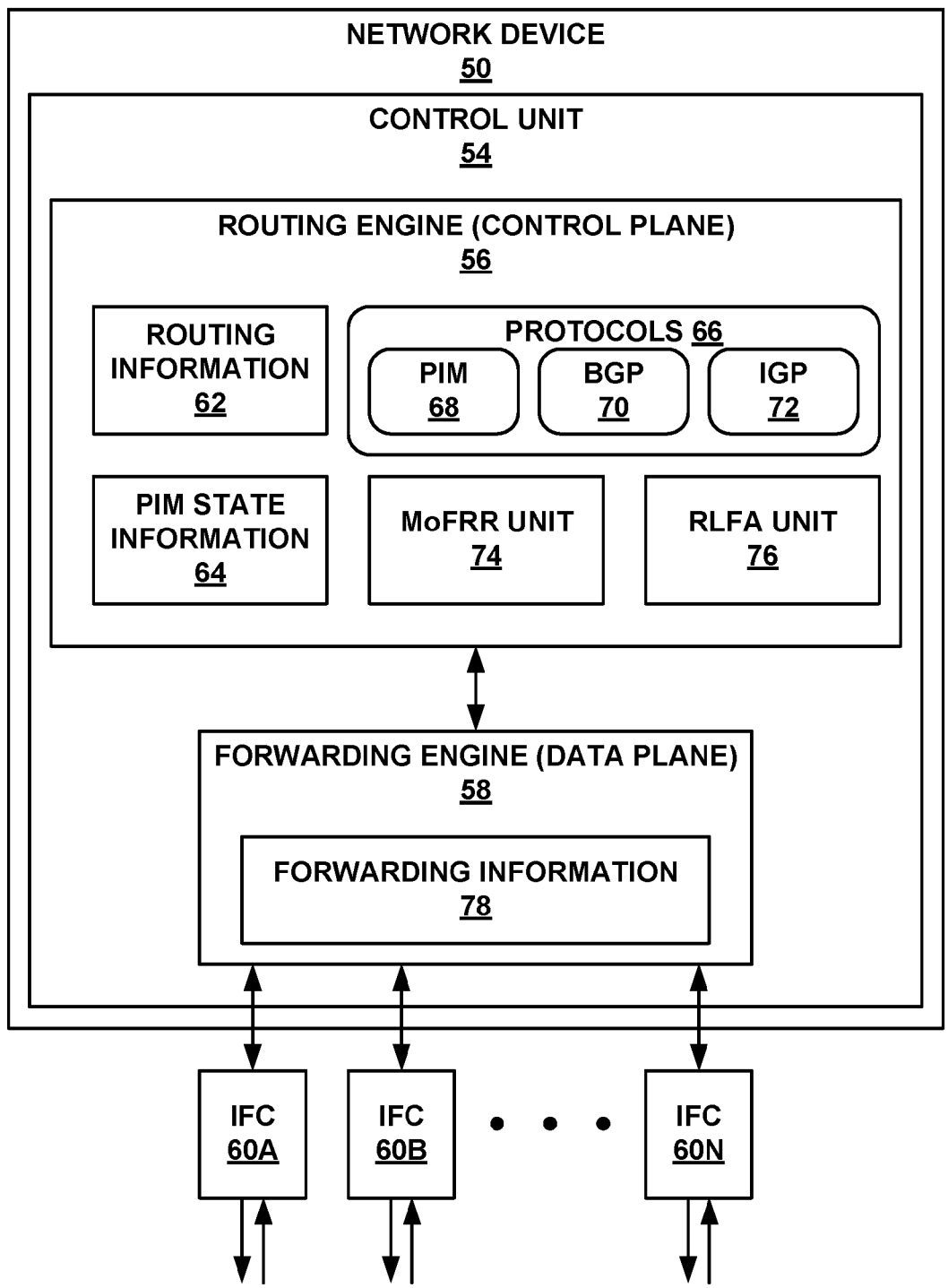
FIG. 3 is a block diagram illustrating an example router including a MoFRR unit and a RLFA unit.

FIG. 3 is a block diagram illustrating an example network device 50 including a MoFRR unit 74 and a RLFA unit 76. In one example, network device 50 may operate as a network device configured to initiate establishment of a primary path and a RLFA backup path toward a source device of a multicast group to provide MoFRR over the RLFA backup path. In this example, network device may operate as a LHR connected to one or more receivers or any router upstream from the LHR and downstream from a FHR connected to a source. For example, router 50 may operate substantially similar to R1 20A from FIGS. 1 and 2. In another example, network device 50 may operate as any network device along the RLFA backup path configured to propagate PIM control messages to establish the RLFA backup path. In this example, network device 50 may operate as any router along the RLFA backup that is upstream from the LHR and downstream from the FHR. For example, router 50 may operate substantially similar to R3 20C or R4 20D from FIGS. 1 and 2.

In the illustrated example of FIG. 3, network device 50 includes interface cards 60A-60N ("IFCs 60") that receive multicast control and data packets via incoming links and send multicast packets via outbound links. IFCs 60 are typically coupled to the incoming links and the outbound links via a number of interface ports. Network device 50 also includes a control unit 54 that determines routes of received packets and forwards the packets accordingly via IFCs 60.

Control unit 54 includes a routing engine 56 and a forwarding engine 58. Routing engine 56 operates as the control plane for router 50 and includes an operating system (not shown) that may provide a multi-tasking operating environment for execution of a number of concurrent processes. For example, routing engine 56 provides an operating environment for various protocols 66 that perform routing functions for network device 50. In the illustrated example of FIG. 3, routing engine 56 includes a border gateway protocol (BGP) 70 and an interior gateway protocol (IGP) 72 as unicast routing protocols used to exchange routing information with other network devices in a network in order to discover the network topology and update routing information 62. In some examples, IGP 72 may be a link-state routing protocol such as open shortest path first (OSPF) or intermediate system-intermedia system (IS-IS). In addition, routing engine 56 includes PIM 68 as a multicast routing protocol used to build multicast distribution trees with the other network devices in the network using routing information 62 and PIM state information 64.

Routing information 62 may describe the topology of the network in which network device 50 resides, and may also describe various routes within the network and the appropriate next hops for each route, i.e., the neighboring network devices along each of the routes. Routing information 62 may include a list of incoming interfaces (IIFs) and a list of outgoing interfaces (OIFs) that indicate which of IFCs 60 are connected to the neighboring network devices in each route. For example, a given route may comprise a multicast route for multicast traffic of a given multicast group. In that example, the list of IIFs included in routing information 62 may include a list of upstream interfaces for all upstream neighbor network devices that have state for the given multicast group, and the list of OIFs included in routing information 62 may include a list of downstream interfaces for all downstream neighbor network devices that have state for the given multicast group.

PIM state information 64 may describe a current status of interfaces for the neighboring network devices in the multicast distribution trees established using PIM 68. For example, PIM state information 64 may include multicast state (e.g., PIM join state and PIM prune state) for each different multicast group within a range for a given multicast distribution tree. More specifically, for each multicast group, PIM state information 64 may include upstream and downstream interfaces toward neighboring network devices that belong to the respective multicast group.

Routing engine 56 analyzes routing information 62 and PIM state information 64 to generate forwarding information 78 installed in forwarding engine 58. Forwarding engine 58 provides data plane functionality for network device 50. Although not shown in FIG. 3, forwarding engine 58 may comprise a central processing unit (CPU), memory and one or more programmable packet-forwarding application-specific integrated circuits (ASICs). Forwarding information 78 associates network destinations with specific next hops and corresponding ports of IFCs 60.

According to the techniques of this disclosure, routing engine 56 of network device 50 is configured to perform MoFRR over a RLFA backup path using PIM 68, MoFRR unit 74, and RLFA unit 76. More specifically, the disclosed techniques include enhancement to PIM 68 to support MoFRR over a RLFA backup path. MoFRR unit 74 may control the MoFRR mechanisms performed by network device 50. For example, MoFRR unit 74 may calculate a shortest path toward a source of a requested multicast group as a primary path, and calculate an alternative path toward the source of the requested multicast group as a backup path. RLFA unit 76 may control the RLFA mechanisms performed by network device 50. For example, RLFA unit 76 may identify a RLFA network device in the network that is capable of forwarding traffic toward the source of the requested multicast group without looping back to network device 50. In this way, RLFA unit 76 may enable MoFRR unit 74 to calculate a RLFA backup path.

To enable multicast protocol signaling of the calculated RLFA backup path, MoFRR unit 74 uses the enhancements to PIM 68 to generate modified PIM control messages having a new PIM message type and an additional field to indicate an address of the RLFA network device of the RLFA backup path. For example, when network device 50 comprises a network device along the RLFA backup path, MoFRR unit 74 may generate the modified PIM control message to be sent toward the RLFA network device instead of toward the source of the requested multicast group. When network device 50 comprises the RLFA network device of the RLFA backup path, MoFRR unit 74 may generate a conventional PIM control message to be sent toward the source of the requested multicast group.

MoFRR unit 74 may be configured to update PIM state information 64 to include multicast state entries for the RLFA backup path. MoFRR unit 74 may also be configured to update routing information 62 to identify one of IFCs 60 as an upstream interface of the multicast state entry for the RLFA backup path, and to identify another one of IFCs 60 as a downstream interface of the multicast state entry for the RLFA backup path.

Routing engine 56 may then program a multicast route for the RLFA backup path with the identified interfaces into forwarding information 78 in forwarding engine 56. Once the primary path and the RLFA backup path are established, multicast traffic will flow over both the paths in a live-live or active-active implementation. Upon receiving the multicast traffic over the RLFA backup path, forwarding engine 58 of network device 50 forwards the multicast traffic according to the multicast route for the RLFA backup path programmed into forwarding information 78.

The architecture of router 50 illustrated in FIG. 3 is shown for exemplary purposes only and should not be limited to this architecture. In other examples, network device 50 may be configured in a variety of ways. In one example, some of the functionally of control unit 54 may be distributed within IFCs 60. Control unit 54 may be implemented solely in software, or hardware, or may be implemented as a combination of software, hardware, or firmware. For example, control unit 54 may include one or more processors which execute software instructions. In that case, the various software modules of control unit 54 may comprise executable instructions stored on a computer-readable medium, such as computer memory or hard disk.

FIG. 4 is a conceptual diagram illustrating an example message format of a modified protocol independent multicast (PIM) control message sent by a network to perform MoFRR over a RLFA backup path. The packet format of the modified PIM control message illustrated in FIG. 4 is merely one example format. In other examples, different packet formats may be used for the modified PIM control message used to perform MoFRR over a RLFA backup path.

In general, the modified PIM control message may be used by a network device to signal a RLFA backup path toward a source of a requested multicast group to provide MoFRR with respect to a primary path toward the source. The illustrated format includes a new PIM message type in type field 80 to indicate that the message is the modified PIM control message for signaling a RLFA backup path. In addition, the illustrated format includes a PQ node address field 82 that indicates an address of a RLFA network device in the RLFA backup path. In some examples, the address of the RLFA network device may comprise an IP address. The addition of PQ node address field 82 in the illustrated format enables network devices along the RLFA backup path to send the modified PIM control messages toward the RLFA network device instead of toward the source, and, therefore, avoid multicast join looping in the RLFA backup path.

As illustrated in FIG. 4, the modified PIM control message format may include an upstream neighbor address of an upstream neighbor network device (i.e., the next hop toward the source of the requested multicast group). The modified PIM control message format may also include addresses for the multicast groups to be joined or pruned (i.e., Multicast Group Address 1 . . . Multicast Group Address m in the illustrated format), and, for each of the multicast groups, individual address for each source to be joined (i.e., Joined Source Address 1 . . . Joined Source Address n in the illustrated format) or pruned (i.e., Pruned Source Address 1 . . . Pruned Source Address n in the illustrated format).

Figure 5:
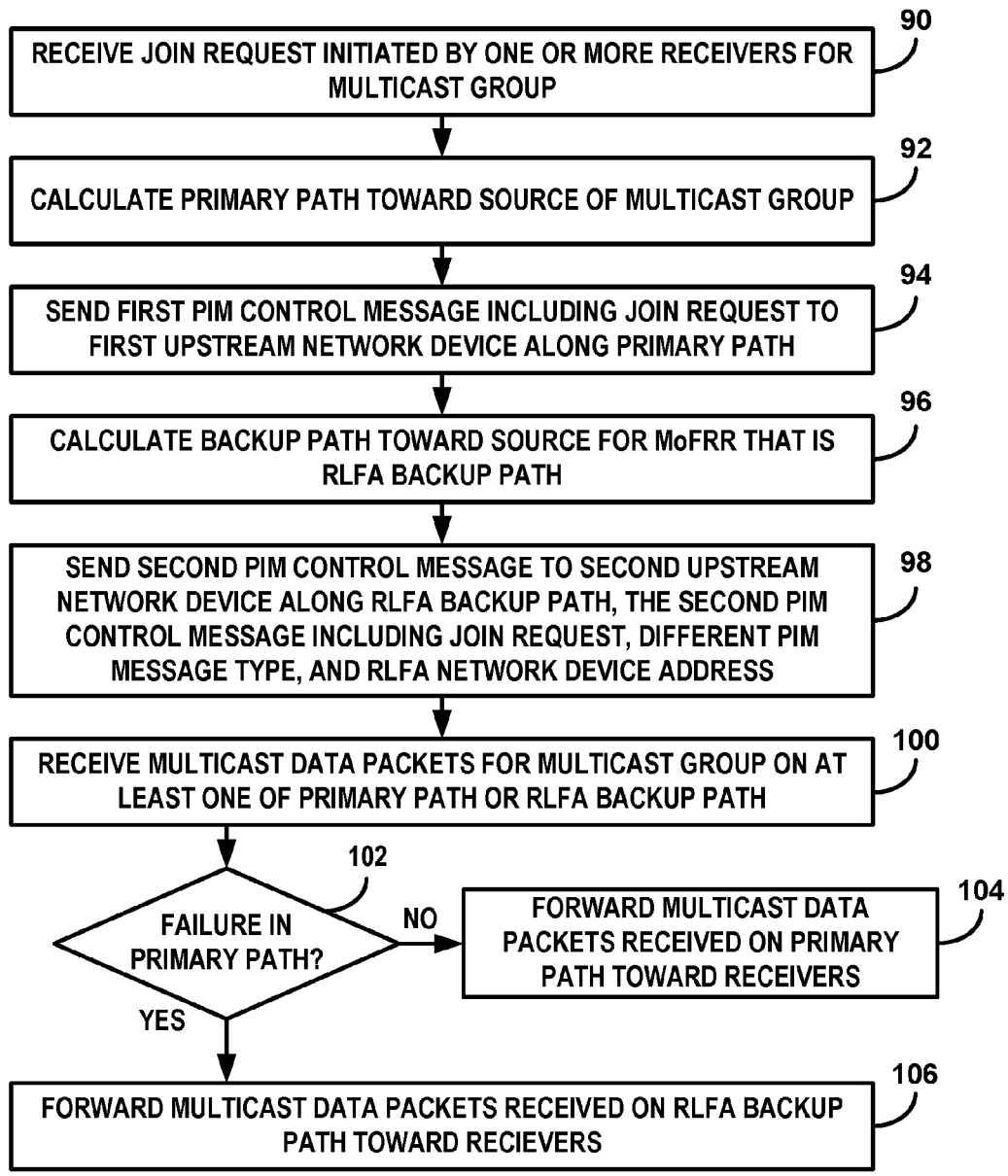
FIG. 5 is a flowchart illustrating an example operation of a network device performing MoFRR over a RLFA backup path.

FIG. 5 is a flowchart illustrating an example operation of a router performing MoFRR over a RLFA backup path. The example operation of FIG. 5 is described with respect to network device 50 from FIG. 3 when operating as either a LHR connected to one or more receivers or any router upstream from the LHR and downstream from a FHR connected to a source. In other examples, the operation of FIG. 5 may also be performed by R1 20A from FIGS. 1 and 2.

When a receiver connected to a network, such as receiver 18 from FIG. 1, is interested in receiving multicast traffic for a multicast group, the receiver will initiate a join request for a multicast group that includes such multicast traffic. Network device 50, operating as a LHR in the network or another router in the network upstream from the LHR, receives the join request for the multicast group from the receiver (90). Upon receiving the join request, routing engine 56 of network device 50 calculates a primary path toward a source of the multicast group (92). Network device 50 then sends a first PIM control message including the join request to a first upstream network device along the primary path (94). In addition to the join request, the first PIM control message may include a first PIM message type and a first upstream neighbor address of the first upstream neighbor network device. For example, the primary path, e.g., primary path 24 from FIGS. 1 and 2, may include a direct link between network device 50 and the first upstream neighbor network device, e.g., R2 20B, toward the source of the multicast group.

In accordance with the techniques of this disclosure, network device 50 is configured with MoFRR capabilities and RLFA capabilities. Network device 50, therefore, uses MoFRR unit 74 and RLFA unit 76 in routing engine 56 to calculate a backup path toward the source of the multicast group for MoFRR with respect to the primary path where the backup path is a RLFA backup path (96). Network device 50 then sends a second PIM control message to a second upstream neighbor network device along the RLFA backup path toward a RLFA network device (98). The second PIM control message includes the join request, a second PIM message type that is different than the first PIM message type, a second upstream neighbor address of the second upstream neighbor network device, and an address of the RLFA network device.

For example, the RLFA backup path, e.g., RLFA backup path 26 from FIGS. 1 and 2, may include a LSP between network device 50 and the RLFA network device, e.g., PQ node 20D, that traverses the second upstream neighbor network device, e.g., R3 20C, and the direct link between the RLFA network device and the first upstream network device, e.g., R2 20B. The RLFA network device, e.g., PQ node 20D, is not a direct neighbor of network device 50, and the second upstream neighbor network device, e.g., R3 20C, is not a LFA network device with respect to the primary path. The second PIM control message includes a second PIM message type that is different than the first PIM message type and the address of the RLFA network device.

After calculating the primary path and the RLFA backup path, routing engine 56 of network device 50 may update PIM state information 64 to include multicast (S,G) state for each of the paths. For example, routing engine 56 create a primary multicast state entry for the multicast group in PIM state information 64 having a primary upstream interface to the first upstream neighbor network device along the primary path toward the source and primary downstream interfaces toward the one or more receivers. In addition, routing engine 56 may create a backup multicast state entry for the multicast group in PIM state information 64 having a backup upstream interface to the second upstream neighbor network device along the RLFA backup path toward the RLFA network device and backup downstream interfaces toward the one or more receivers.

Based on routing information 62 and PIM state information 64, routing engine 56 may program a multicast route for the multicast group into forwarding information 78 in forwarding engine 56 including both the primary path and the RLFA backup path. More specifically, to program the multicast route into forwarding information 64, routing engine 56 may select the primary upstream interface of the primary multicast state entry as a first incoming interface (IIF) of one of IFCs 60 of network device 50 for the primary path. Routing engine 56 may also select the backup upstream interface of the backup multicast state entry as a second IIF of one of IFCs 60 of network device 50 for the RLFA backup path.

Upon establishment of the primary path and the RLFA backup path toward the source of the multicast group, network device 50 receives multicast data packets for the multicast group on at least one of the primary path or the RLFA backup path (100). Both the primary path and the RLFA backup path are active paths such that the multicast data packets are sent from the source device along both paths to network device 50.

If a failure has not been detected in the primary path (NO branch of 102), forwarding engine 58 of network device 50 forwards the multicast data packets received on the primary path toward the interested receivers (104). In this case, forwarding engine 58 forwards the multicast data packets received on the primary path according to the primary multicast state entry in PIM state information 64 that was used to program the multicast route for the multicast group in forwarding information 78. For example, in accordance with the programmed multicast route in forwarding information 78, forwarding engine 56 forwards the multicast data packets for the multicast group received over the primary path, and drops the multicast data packets for the multicast group received over the RLFA backup path. In this way, forwarding engine 56 will only forward one set of the multicast data packets for the multicast group to the receiver.

Upon detecting a failure in the primary path (YES branch of 102), forwarding engine 58 of network device 50 instead forwards the multicast data packets received on the RLFA backup path toward the interested receivers (106). In this case, forwarding engine 58 forwards the multicast data packets received on the RLFA backup path according to the backup multicast state entry in PIM state information 64 that was used to program the multicast route for the multicast group in forwarding information 78. For example, forwarding engine 58 will perform MoFRR by switching from the failed primary path to the RLFA backup path, and forward the multicast data packets for the multicast group to the receivers according to the updated multicast route in forwarding information 78.

Figure 6:
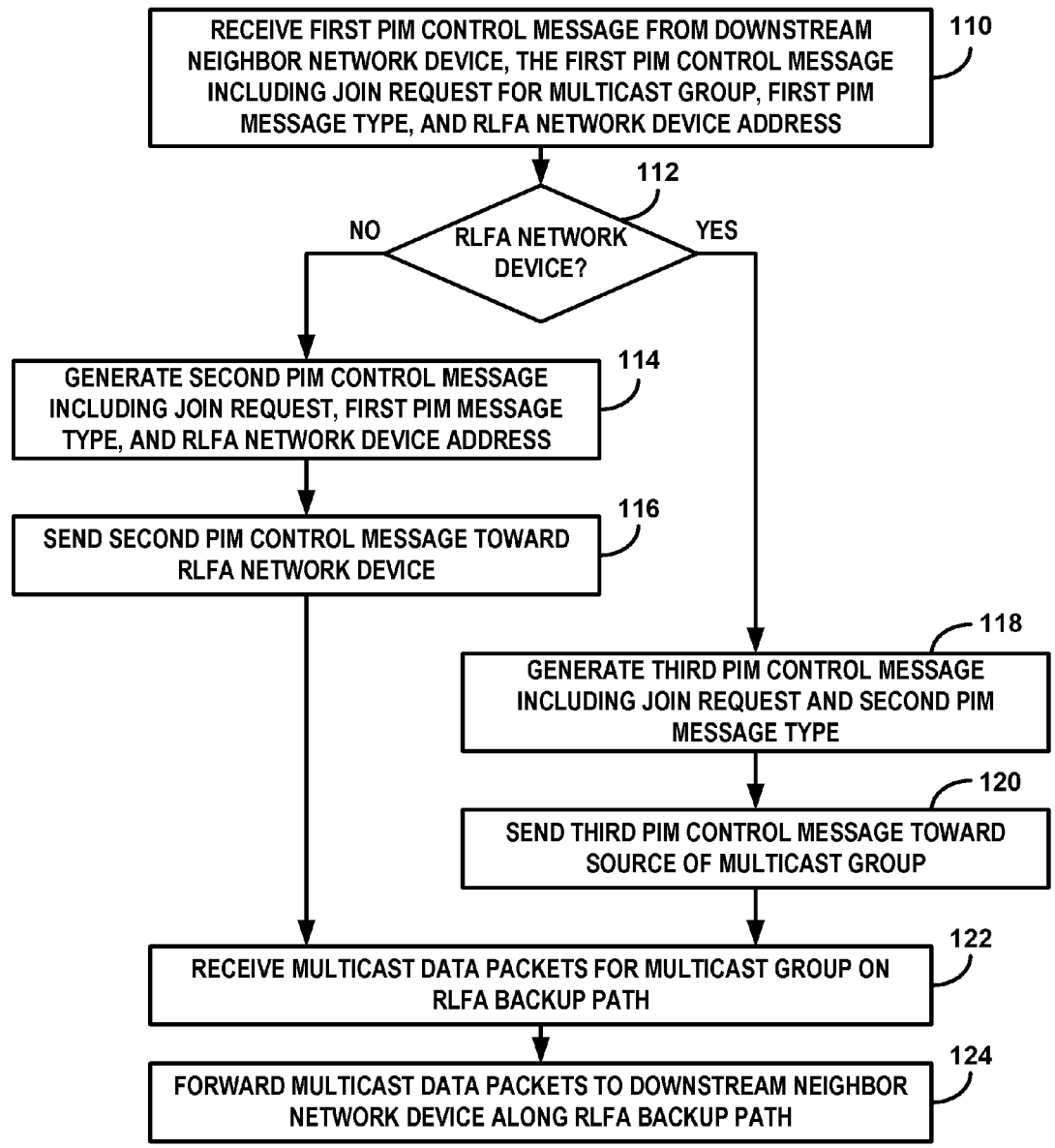
FIG. 6 is a flowchart illustrating an example operation of a network device along a RLFA backup path.

FIG. 6 is a flowchart illustrating an example operation of a router along a RLFA backup path. The example operation of FIG. 6 is described with respect to network device 50 from FIG. 3 when operating as any router along a RLFA backup path that is upstream from a LHR connected to one or more receivers and downstream from a FHR connected to a source. In other examples, the operation of FIG. 6 may also be performed by R3 20C or R4 20D from FIGS. 1 and 2.

Network device 50 receives a first PIM control message from a downstream neighbor network device where the first PIM control messages includes a join request for a multicast group, a first PIM message type, and an address of a RLFA network device in the RLFA backup path (110). For example, the RLFA backup path, e.g., RLFA backup path 26 from FIGS. 1 and 2, may include a LSP between the downstream neighbor network device, e.g., R1 20A, and the RLFA network device, e.g., PQ node 20D, that traverses one or more intermediate network devices, e.g., R3 20C, and a direct link between the RLFA network device and an upstream neighbor network device, e.g., R2 20B, toward the source of the multicast group.

In the case that network device 50 is not the RLFA network device identified in the first PIM control message (NO branch of 112), network device 50 generates a second PIM control message including the join request, the first PIM message type, and the address of the RLFA network device (114). Network device 50 then sends the second PIM control message along the RLFA backup path toward the RLFA network device (116). In this case, network device 50 is not a LFA network device with respect to the primary path toward the source of the multicast group.

Routing engine 56 of network device 50 may also update PIM state information 64 to include multicast (S,G) state for the RLFA backup path. For example, routing engine 56 may create a multicast state entry for the multicast group in PIM state information 64 having an upstream interface toward the RLFA network device identified in the first PIM control message and a downstream interface toward the downstream neighbor network device. Based on routing information 62 and PIM state information 64, routing engine 56 may program a multicast route for the multicast group into forwarding information 78 in forwarding engine 56 including the RLFA backup path. More specifically, to program the multicast route into forwarding information 64, routing engine 56 may select the upstream interface of the multicast state entry as an incoming interface (IIF) of one of IFCs 60 of network device 50 for the RLFA backup path, and select the downstream interface of the multicast state entry as an outgoing interface (OIF) of one of IFCs 60 of network device 50 for the RLFA backup path.

In the case that network device 50 is the RLFA network device, e.g., PQ node 20D, identified in the first PIM control message (YES branch of 112), network device 50 generates a third PIM control message including the join request and a second PIM message type that is different than the first PIM message type (118). Network device 50 then sends the third PIM control message toward the source of the multicast group (120).

Routing engine 56 of network device 50 may also update PIM state information 64 to include multicast (S,G) state for the RLFA backup path. For example, routing engine 56 may create a multicast state entry for the multicast group in PIM state information 64 having an upstream interface toward the source of the multicast group and a downstream interface toward the downstream neighbor network device. Based on routing information 62 and PIM state information 64, routing engine 56 may program a multicast route for the multicast group into forwarding information 78 in forwarding engine 56 including the RLFA backup path. More specifically, to program the multicast route into forwarding information 64, routing engine 56 may select the upstream interface of the multicast state entry as an incoming interface (IIF) of one of IFCs 60 of network device 50 for the RLFA backup path, and select the downstream interface of the multicast state entry as an outgoing interface (OIF) of one of IFCs 60 of network device 50 for the RLFA backup path.

In either of the cases described above, upon establishment of the RLFA backup path toward the source of the multicast group, network device 50 receives multicast data packets for the multicast group on the RLFA backup path (122). Forwarding engine 58 of network device 50 then forwards the multicast data packets for the multicast group to the downstream neighbor network device along the RLFA backup path (124). For example, forwarding engine 58 forwards the multicast data packets received on the RLFA backup path according to the multicast state entry in PIM state information 64 that was used to program the multicast route for the multicast group in forwarding information 78.

Various examples of the invention have been described. These and other examples are within the scope of the following claims.

What is claimed is:

1. A method comprising:
receiving, by a network device configured with multicast only fast re-route (MoFRR), a join request initiated by one or more receivers for a multicast group;
sending, by the network device, a first multicast routing protocol control message including the join request to a first upstream neighbor network device along a primary path toward a source of the multicast group, wherein the primary path comprises a direct link between the network device and the first upstream neighbor network device;
sending, by the network device, a second multicast routing protocol control message including the join request to a second upstream neighbor network device along a remote loop-free alternate (RLFA) backup path toward a RLFA network device, the second control message further including a different message type than the first control message and an address of the RLFA network device, wherein the RLFA backup path comprises a label switching path (LSP) between the network device and the RLFA network device that traverses the second upstream neighbor network device and a direct link between the RLFA network device and the first upstream neighbor network device;
receiving, by the network device from the source of the multicast group, multicast data packets for the multicast group on at least one of the primary path or the RLFA backup path; and
forwarding, by the network device toward the one or more receivers, the multicast data packets for the multicast group.

2. The method of claim 1, wherein the RLFA network device is not a direct neighbor of the network device, and wherein the second upstream neighbor network device is not a loop-free alternate (LFA) network device.

3. The method of claim 1,
wherein the first control message includes a first message type and a first upstream neighbor address of the first upstream neighbor network device; and
wherein the second control message includes a second message type that is different than the first message type, a second upstream neighbor address of the second upstream neighbor network device, and the address of the RLFA network device.

4. The method of claim 1, further comprising:
creating, by the network device, a primary multicast state entry for the multicast group having a primary upstream interface to the first upstream neighbor network device along the primary path toward the source of the multicast group, and primary downstream interfaces toward the one or more receivers; and
creating, by the network device, a backup multicast state entry for the multicast group having a backup upstream interface to the second upstream neighbor network device along the RLFA backup path toward the RLFA network device, and backup downstream interfaces toward the one or more receivers.

5. The method of claim 4, wherein forwarding the multicast data packets for the multicast group comprises:
forwarding the multicast data packets received on the primary path according to the primary multicast state entry; and
upon detecting a failure in the primary path, forwarding the multicast data packets received on the RLFA backup path according to the backup multicast state entry.

6. A network device comprising:
a processor configured to:
receive a join request for a multicast group from one or more receivers,
send a first multicast routing protocol control message including the join request to a first upstream neighbor network device along a primary path toward a source of the multicast group, wherein the primary path comprises a direct link between the network device and the first upstream neighbor network device, and
wherein the network device is configured with multicast only fast re-route (MoFRR), send a second multicast routing protocol control message including the join request to a second upstream neighbor network device along a remote loop-free alternate (RLFA) backup path toward a RLFA network device, the second control message further including a different message type than the first control message and an address of the RLFA network device, wherein the RLFA backup path comprises a label switching path (LSP) between the network device and the RLFA network device that traverses the second upstream neighbor network device and a direct link between the RLFA network device and the first upstream neighbor network device; and
a forwarding engine configured to:
receive, from the source of the multicast group, multicast data packets for the multicast group on at least one of the primary path or the RLFA backup path, and
forward the multicast data packets for the multicast group toward the one or more receivers.

7. The network device of claim 6, wherein the RLFA network device is not a direct neighbor of the network device, and wherein the second upstream neighbor network device is not a loop-free alternate (LFA) network device.

8. The network device of claim 6,
wherein the first control message includes a first message type and a first upstream neighbor address of the first upstream neighbor network device; and
wherein the second control message includes a second message type that is different than the first message type, a second upstream neighbor address of the second upstream neighbor network device, and the address of the RLFA network device.

9. The network device of claim 6, wherein the routing engine is configured to:
create a primary multicast state entry for the multicast group having a primary upstream interface to the first upstream neighbor network device along the primary path toward the source of the multicast group, and primary downstream interfaces toward the one or more receivers; and
create a backup multicast state entry for the multicast group having a backup upstream interface to the second upstream neighbor network device along the RLFA backup path toward the RLFA network device, and backup downstream interfaces toward the one or more receivers.

10. The network device of claim 9, wherein the forwarding engine is configured to:
forward the multicast data packets received on the primary path according to the primary multicast state entry; and
upon detecting a failure in the primary path, forward the multicast data packets received on the RLFA backup path according to the backup multicast state entry.

11. A method comprising:
receiving, by a network device from a downstream neighbor network device, a first multicast routing protocol control message including a join request for a multicast group, a first message type, and an address of a remote loop-free alternate (RLFA) network device in a RLFA backup path, wherein the RLFA backup path comprises a label switching path (LSP) between the downstream neighbor network device and the RLFA network device that traverses one or more intermediate network devices and a direct link between the RLFA network device and an upstream neighbor network device toward a source of the multicast group;
based on the network device not being the RLFA network device identified in the first control message, generating, by the network device, a second multicast routing protocol control message including the join request, the first message type, and the address of the RLFA network device, and sending the second control message along the RLFA backup path toward the RLFA network device;
based on the network device being the RLFA network device identified in the first control message, generating, by the network device, a third multicast routing protocol control message including the join request and a second message type that is different than the first message type, and sending the third control message along the RLFA backup path toward the source of the multicast group;
receiving, by the network device from the source of the multicast group, multicast data packets for the multicast group on the RLFA backup path; and
forwarding, by the network device, the multicast data packets for the multicast group to the downstream neighbor network device along the RLFA backup path.

12. The method of claim 11, wherein, based on the network device not being the RLFA network device identified in the first control message, the network device is not a loop-free alternate (LFA) network device toward the source of the multicast group.

13. The method of claim 11, further comprising, based on the network device not being the RLFA network device identified in the first control message, creating, by the network device, a multicast state entry for the multicast group having an upstream interface toward the RLFA network device and a downstream interface toward the downstream neighbor network device.

14. The method of claim 11, further comprising, based on the network device being the RLFA network device identified in the first control message, creating, by the network device, a multicast state entry for the multicast group having an upstream interface toward the source of the multicast group and a downstream interface toward the downstream neighbor network device.

15. A network device comprising:
a processor configured to:
receive, from a downstream neighbor network device, a first multicast routing protocol control message including a join request for a multicast group, a first message type, and an address of a remote loop-free alternate (RLFA) network device in a RLFA backup path, wherein the RLFA backup path comprises a label switching path (LSP) between the downstream neighbor network device and the RLFA network device that traverses one or more intermediate network devices and a direct link between the RLFA network device and an upstream neighbor network device toward a source of the multicast group,
based on the network device not being the RLFA network device identified in the first control message, generate a second multicast routing protocol control message including the join request, the first message type, and the address of the RLFA network device, and send the second control message along the RLFA backup path toward the RLFA network device, and
based on the network device being the RLFA network device identified in the first control message, generate a third multicast routing protocol control message including the join request and a second message type that is different than the first message type, and send the third control message along the RLFA backup path toward the source of the multicast group; and
a forwarding engine configured to:
receive, from the source of the multicast group, multicast data packets for the multicast group on the RLFA backup path, and
forward the multicast data packets for the multicast group to the downstream neighbor network device along the RLFA backup path.

16. The network device of claim 15, wherein, based on the network device not being the RLFA network device identified in the first control message, the network device is not a loop-free alternate (LFA) network device toward the source of the multicast group.

17. The network device of claim 15, wherein the routing engine is configured to, based on the network device not being the RLFA network device identified in the first control message, create a multicast state entry for the multicast group having an upstream interface toward the RLFA network device and a downstream interface toward the downstream neighbor network device.

18. The network device of claim 15, wherein the routing engine is configured to, based on the network device being the RLFA network device identified in the first control message, create a multicast state entry for the multicast group having an upstream interface toward the source of the multicast group and a downstream interface toward the downstream neighbor network device.

* * * * *